Dec. 24, 1963  A. R. BARRINGER  3,115,326
MOUNTING SYSTEM FOR THE ISOLATION OF ROTATIONAL VIBRATIONS
Filed Nov. 27, 1961  3 Sheets-Sheet 1

*Inventor*
ANTHONY RENE BARRINGER by: *Cavanagh & Norman.*

Dec. 24, 1963  A. R. BARRINGER  3,115,326
MOUNTING SYSTEM FOR THE ISOLATION OF ROTATIONAL VIBRATIONS
Filed Nov. 27, 1961  3 Sheets-Sheet 2

Inventor
ANTHONY RENE BARRINGER
by: Cavanagh & Norman

Dec. 24, 1963 A. R. BARRINGER 3,115,326
MOUNTING SYSTEM FOR THE ISOLATION OF ROTATIONAL VIBRATIONS
Filed Nov. 27, 1961 3 Sheets-Sheet 3
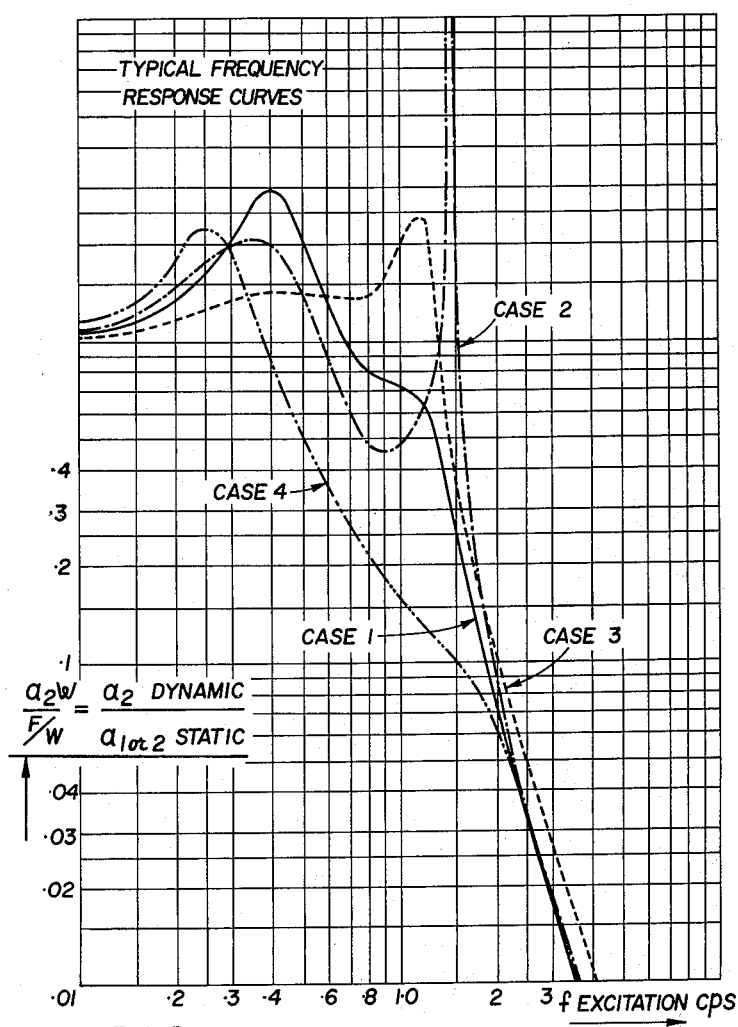
FIG. 5
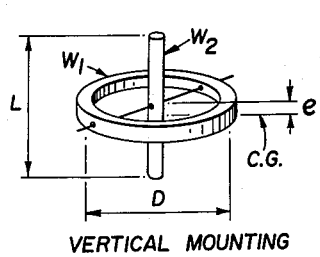
VERTICAL MOUNTING
FIG. 6
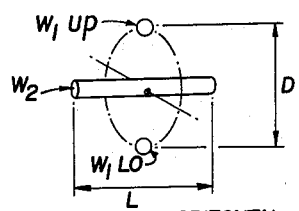
FIG. 7 HORIZONTAL MOUNTING
Inventor
ANTHONY RENE BARRINGER
by: Cavanagh & Norman

# United States Patent Office 3,115,326
Patented Dec. 24, 1963

3,115,326
MOUNTING SYSTEM FOR THE ISOLATION OF
ROTATIONAL VIBRATIONS
Anthony Rene Barringer, Agincourt, Ontario, Canada,
assignor to Barringer Research Limited
Filed Nov. 27, 1961, Ser. No. 155,023
19 Claims. (Cl. 248—358)

The invention relates to an instrument mounting system for isolating an instrument from vibration and has particular reference for use with portable instruments such as airborne detection devices.

Mounting devices for the isolation of vibration or movement of various types have been available for some time. Such devices have however suffered from a variety of defects. Thus some such devices have occupied a substantial space surrounding the instrument which has been unacceptable particularly in the case of a portable instrument. Other such devices have isolated only one type of movement leaving the instrument subject to the undesirable effects of other types of movement. Other such defects include the isolation of movements only over a relatively small range of frequencies and amplitudes while permitting movements outside such range to pass.

In the particular case of electromagnetic field detection and measurement certain specific problems arise when attempting to overcome undesirable system vibrations.

One problem of vibration isolation is encountered when using a magnetometer, of the atom portion precession type, to detect variations in strength in the earth's magnetic field. In this method a sample of liquid is polarized in a strong magnetic field, whereupon sudden termination of the field allows the atom portions within the sample to precess about the earth's magnetic field, the frequency of precession being directly related to the strength of the earth's magnetic field. For certain fundamental reasons rotation of the sensing coil in the instrument relative to the direction of the earth's magnetic field will produce an error in reading which is proportional to the rate of rotation.

A further problem of vibration isolation is encountered in attempting to detect time varying electromagnetic fields in the pressure of strong magnetic fields such as when using a magnetic dipole coil for aerial geophysical mapping. In this case any vibratory movements of the dipole caused by external forces will produce noise voltages due to the earth's magnetic field. These noise voltages may severely limit the sensitivity of the coil and measuring system. While isolation of vibrations in the audio frequency spectrum is comparatively simple to obtain with conventional shock mount systems, difficulties arise when attempting to isolate frequencies below 20 c.p.s., and particularly below 5 c.p.s.

In order to render an electromagnetic detection device more sensitive to desired frequencies and amplitudes thereof it is necessary to reduce or eliminate noise interference. Considering such an instrument, comprised of a number of turns of wire wound about a core piece and having a longitudinal axis, noise will only occur upon non-longitudinal rotation of the instrument. In a magnetic field non-rotational translation of the device relative to the longitudinal axis will not produce noise voltages since the magnetic flux linkage with the coil will remain constant. However, it will be appreciated that rotation of the coil about a non-longitudinal axis will cause a change in coupling with the magnetic flux thus inducing a voltage in the coil.

In order to achieve effective vibration isolation in any system reference to the known art on the subject "Vibrations and shock isolation" by Charles E. Crede (John Wiley & Sons, New York), shows that it is necessary for the shock mounts to have a self resonant frequency of at least half of the lowest frequency which it is desired to isolate.

A typical equation covering transmissoin of vibration through a simple vibration isolation system for a single-degree-of-freedom is as follows:

$$T = \frac{1}{1 - \frac{f_e^2}{f_r^2}}$$

where:

T transmission of vibrations
$f_e$ frequency of vibrations, and
$f_r$ natural resonant frequency of isolation From this equation it can be seen that when the ratio of $f_e:f_r$ becomes 2:1 the transmissibility of vibrations is down to one third. It is also clear from the equation that transmissibility is for vibration substantially lower in frequency than the natural resonant frequency of the isolation, and that amplification of vibrations is obtained on frequencies close to the natural resonant frequency. It is therefore obvious that frequencies of natural resonance substantially lower than the vibration frequencies are required in order to achieve effective isolation.

A further very significant point is that the amplitudes of oscillation of systems oscillating at lower frequencies become much greater than those systems oscillating at higher frequencies. The oscillation amplitudes are directly related to the static deflection of the system when with a mass W. For a single-degree-of-freedom system static deflection is given by the formula:

$$D = \frac{9.8}{F_r^2}$$

where:

D static deflection in inches, and
$f_r$ natural resonant frequencies

It will be noted that static deflection can be calculated for known self-resonant frequencies without reference to the mass involved. It will also be seen from the equation that static deflections increase inversely as the square of the self-resonant frequency, which in effect means that a far greater freedom of movement is required for systems which are used to isolate low frequencies. Under many operational conditions this becomes extremely complex, as for example in an airborne system in which the sensing coil has to be towed in a bird or placed on a wing tip. A further example is in the sensing of a fluctuation in the earth's magnetic field at frequencies in the range 0.1 c.p.s. to 30 c.p.s. Sensing coils consisting of many thousands of turns of wire wound on high permeability cores are being used for this purpose but they are severely affected by seismic tremors which in turn create noise voltages due to the movement of the coil in the earth's magnetic field. A suitable shock mounting system would require a natural period of 20 seconds or 0.05 cycle per second, which in turn would require a static deflection of 16 feet, a fact which would obviously entail an extremely complex and cumbersome shock mounting system.

The present invention refers to the isolation of rotational vibrations as opposed to non-rotational vibrations. In considering a coil mounted in uniform magnetic fields, noise voltages will only be generated when the flux coupling with the coil voltages changes. Coil voltages generated are given by the following equation:

$$E = -N\frac{d\phi}{dt}$$

where:

N number of turns in coil $\frac{d\phi}{dt}$ rate of change of flux coupling

Changes of flux coupling will not occur when the coil moves in a uniform magnetic field without any rotation of the plane of the coil with respect to the flux lines of the field. If a coil is mounted so that its centre is free to move in any direction in a uniform magnetic field, but the plane of the coil always moves into parallel planes, then voltages cannot be generated in the coil. This could be achieved by mounting the coil in gimbals and attaching a gyroscope to it. However, this is not suitable in practice due to the difficulty of isolating electrical noise generated by gyroscopes. A further difficulty is due to the rigidity of a gyroscope in space, whereby even slow forced turns of a coil-gyro assembly will cause very undesirable precession oscillation of the system.

The present invention employs the use of gimbals but restores the position of the coil to a desired axis by the use of spring or pendulous restoring systems of self-resonant frequencies substantially below the lowest vibrational frequency at which it is desired to isolate. In practice extremely low self-resonant rotational frequencies can easily be achieved in only a fraction of the volume required for a shock system providing similar low self-resonant frequencies for either simple linear single-degree-of-freedom systems or more complex multi-degree-of-freedom systems.

It is therefore an object of the present invention to provide an instrument mounting system which will isolate an instrument used therein from undesirable vibrations of predetermined frequencies.

It is a further object of this invention to provide an instrument mounting system having a comparatively low period of oscillation whereby deflection in the system is kept to a minimum.

It is a further object of this invention to provide an instrument mounting system which is responsive only to frequencies below a predetermined limit while isolating those above it.

It is still a further object of this invention to provide an instrument mounting system having adjustment means therein, whereby a predetermined load may be set within the damping system.

The present invention seeks to achieve the foregoing and other objectives which will appear from the following description and accompanying drawings of preferred embodiments by the provision of a shock isolation system for an instrument, whereby suddenly occurring movements of a carrier are smoothed out by the system thus allowing comparatively low frequency oscillations of an instrument contained therein while preventing momentary high frequency movements. The isolation may be accomplished about any one or more axis of a reference system and for a predetermined range of frequencies.

In the drawings:

FIGURE 5 is a chart illustrating typical frequency response curves achieved by the present invention;

FIGURE 6 is a diagrammatic representation of a vertical mounting system; and

FIGURE 7 is a diagrammatic representation of a horizontal mounting system.

Figure 1:
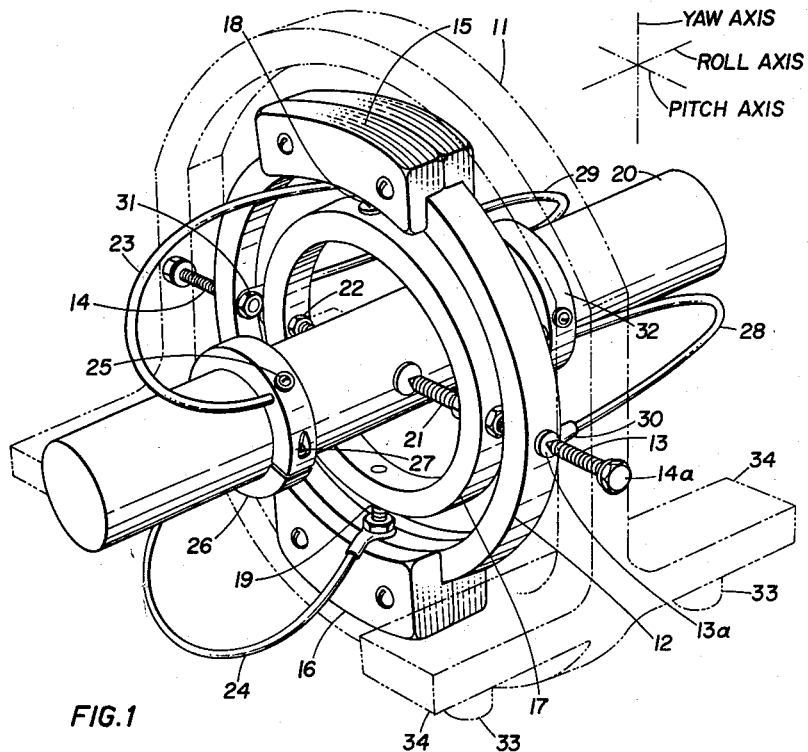
FIGURE 1 is a perspective view of one preferred embodiment according to the present invention for use with horizontally mounted instruments.
Figure 2:
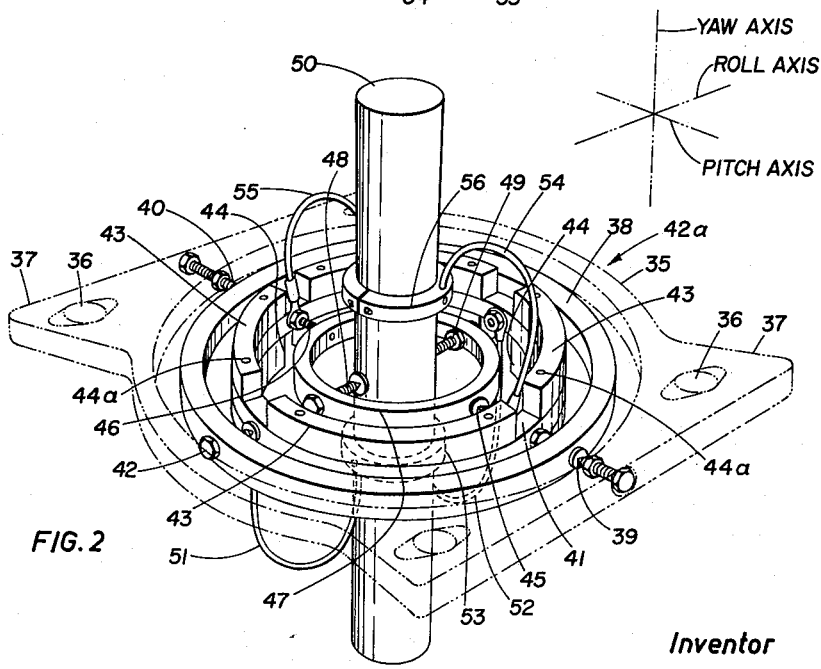
FIGURE 2 is a perspective view of a second preferred embodiment for use with a vertically mounted instrument.

The mounting systems as shown in FIGURES 1 and 2 are adapted for air borne use within a suitable carrier such as disclosed in my co-pending United States application Ser. No. 551 filed January 5, 1960. The carrier is adapted to be towed through the air by an aircraft and has aerodynamic characteristics suitable for use with the present invention.

In the following discussion the pitch, roll and yaw axes relative to the device in a carrier having forward movement are defined as:

The pitch axis is the horizontal transverse axis;
The roll axis is the horizontal longitudinal axis; and
The yaw axis is the vertical axis.

The above axes are illustrated in the diagrams accompanying FIGURES 1 and 2.

Referring to FIGURE 1 the horizontal instrument mounting comprises a frame 11 shown in phantom which is adapted to support outer gimbal ring 12 pivoted in a horizontal manner by bearings 13 and 14.

Bearing 13 is threadably inserted in frame 11 and is thus adjustable for engagement with bearing pad 13a. Nut 14a provides locking means for bearing 13. This type of bearing is one preferred method used, other bearings in the systems being similar in construction.

From this it will be seen that gimbal ring 12 is pivotal about the pitch axis within frame 11. Secured to gimbal ring 12 are a pair of diametrically placed weights, upper weight 15 and lower weight 16 such that a line through the C.G. of each weight is substantially vertical and passes through the centerline of bearings 13 and 14. The mass of weight 16 is greater than the mass of weight 15 whereby the C.G. of ring 12 and weights 15 and 16 is in a plane below the centerline of bearings 13 and 14. Thus the weights 15 and 16 form a pendulum pivoting about bearings 13 and 14, the eccentricity of the pendulum being the distance between the centerline of said bearings to said plane.

An inner gimbal ring 17 is pivoted in a vertical manner within gimbal ring 12 by bearings 18 and 19 adjustably secured thereto. Thus gimbal ring 17 is pivotal about the yaw axis within gimbal ring 12.

A field measuring instrument 20 such as a magnetic coil dipole is similarly pivotally mounted within gimbal ring 17 by adjustable bearings 21 and 22 and is so mounted to pivote about the pitch axis. Instrument 20 is pivoted about a midpoint and as such constitutes a balanced beam upon considering the mechanics of the system.

Secured to diametricaly opposite points on beam 20 is a pair of flexible members 23 and 24 which are deformed to end in rigid attachment with substantialy diametricaly opposite points on gimbal ring 12. Members 23 and 24 are positioned in a substantially vertical manner and thus in bending offer damped resistance to movement of beam 20 in the pitch direction.

Attachment of members 23 and 24 on beam 20 is secured by screws 25 (one only shown) threadably inserted into clamping ring 26, adjustably clamped onto beam 20 by means of screw 27. Thus adjustment of ring 26 along the length of beam 20 will alter the bias on flexible members 23 and 24.

A second pair of flexible members 28 and 29 are secured to outer gimbal ring 12 at diametrically opposite points 30 and 31. The other ends of members 28 and 29 end in attachment with clamping ring 32 which is similarly adjustable as ring 26.

The first pair of flexible members 23 and 24 thus align instrument 20 while providing shock isolation in a vertical plane, i.e. about the pitch axis, whereas the second pair of flexible members offer alignment and shock isolation in a horizontal plane, i.e. about the yaw axis.

In the presently preferred embodiment both pairs of flexible members are made from a butyl rubber, however, any material which would offer resilient resistance to movement in the system and thus provide the necessary shock isolation would be suitable. Examples of other materials are coil springs, strip spring steel, and the like.

Further protection against incident shock loads is provided by shock mounts such as resilient pads 33 secured to extensions 34 of frame 11.

A second preferred embodiment is shown in FIGURE 2 which illustrates a vertical instrument mounting comprising frame 35 provided with shock mounts 36 on extensions 37. Supported within frame 35 is an outer gimbal ring 38 pivoted on bearings 39 and 40 which are adjustably secured to frame 35. Gimbal ring 38 is thus free to pivot about the pitch axis.

An intermediate gimbal ring 41 is piovtally secured within gimbal ring 38 on bearings 42 and 42a and is free to pivot about the roll axis. Weights 43 are uniformly distributed about the upper surface of ring 41 and weights 44 are uniformly distributed about the under surface of ring 41. Weights 43 and 44 are secured to ring 41 by screws 44a. The combined mass of weights 44 is greater than the combined mass of weights 43 and thus the C.G. of ring 41 and weights 43 and 44 lies in a plane below the centerline of bearings 42 and 42a.

Weights 43 and 44 pivoting about bearings 42 and 42a thus form a pendulum the eccentricity of which equals the distance from the centerline of bearings 42 and 42a to the C.G.

Pivotally secured within gimbal ring 41 on bearings 45 and 46 is an inner gimbal ring 47 which is pivoted to move about the pitch axis. Pivotally secured within this inner gimbal ring 47 on bearings 48 and 49 is an instrument 50 such as a magnetic coil dipole. Instrument 50 is pivoted about a midpoint and is free to pivot about the roll axis and as such constitutes a balanced beam.

A pair of flexible members 51 and 52 have one each end secured to intermediate gimbal ring 41 at bearing positions 42 and 42a and have the other ends thereof secured to clamping ring 53 which is adjustable along the length of beam 50 in a manner similar to clamping ring 26 in FIGURE 1. Similarly a pair of flexible members 54 and 55 are secured to gimbal ring 41 at bearings 45 and 46 to clamp 56 slidably adjustable on beam 50.

The first pair of flexible members 51 and 52 thus align instrument 50 while providing shock isolation in a vertical plane about the pitch axis within the inner gimbal system, that is the system composed of beam 50, inner gimbal ring 47, and intermediate gimbal ring 41. The second pair of flexible members 54 and 55 offer alignment and shock isolation in a vertical plane, about the roll axis with the inner gimbal system.

The following discussion relates to the method of utilizing the present invention to provide a shock isolation mounting system for an instrument such as a magnetic dipole of given dimensions and mass.

In this discussion the vertical mounting is treated for pitch or roll since the instrument is insensitive to movement about the yaw axis. The horizontal mounting is treated for pitch only since in the yaw direction a simple shock mount only is provided and the instrument being insensitive to movement about the roll axis.

To choose workable space dimensions, masses and spring rates for the above described suspension system it is preferable to perform frequency response calculations in order to obtain the design criteria and the following is an outline of these calculations.

Generally speaking a satisfactory suspension is obtained when:

(1) Both the upcoupled frequencies of the pendulum alone and the rubber-dipole (i.e. the instrument governed by the rubber shock absorber members) alone are kept low, with the pendulum frequency preferably lower than that of the dipole;

(2) The pendulum moment of inertia is kept below that of the dipole;

(3) The pendulum mass is chosen as high as possible. Conditions (1), (2), (3) imply then that the pendulum eccentricity should be chosen as small as possible.

Figure 3:
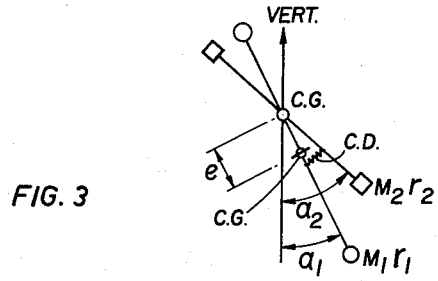
FIGURE 3 is a diagram of the method of the instant invention.

In the following:

$A$ = static deflection
$M_1$ = mass of pendulum
$M_2$ = mass of balanced beam (instrument)
$r_1$ = radius of gyration $M_1$
$r_2$ = radius of gyration $M_2$
$C$ = stiffness of torque link
$D$ = damping in system
$\alpha_1$ = angle of displacement $M_1$
$\alpha_2$ = angle of displacement $M_2$
$F$ = disturbing force
$W$ = weight of mass $M_g$
$V$ = velocity $R$ = inertia ratio $\dfrac{M_2 r_2^2}{M_1 r_2^2}$ $\omega$ = frequency The system is analysed about one axis at a time and the diagram shown in FIGURE 3 is illustrative of one such axis.

The equations of motion for the system are:

(1) $\quad M_2 r_2^2 \ddot{\alpha}_2 = C(\alpha_2 - \alpha_1) - D(\dot{\alpha}_2 - \dot{\alpha}_1)$ (2) $\quad M_1 r^2 \ddot{\alpha}_1 = +C(\alpha_2 - \alpha_1) + D(\dot{\alpha}_2 - \dot{\alpha}_1) - 1 M_1 g \alpha_1 - F1$ From this it will be seen that the inertia, stiffness, and geometric characteristics of the system can be expressed in a more concise form by using ratios and dynamic properties.

If the pendulum were isolated its frequency would be:

(3) $\quad\quad \omega_1 = V\overline{\dfrac{1g}{r_1^2}}$ rad/sec.

If the beam had its torque link grounded its frequency would be:

(4) $\quad\quad \omega_2 = \overline{\dfrac{V_1 - j^2}{4}}$

The damping exponent $$= \omega_2 \dfrac{j}{2}$$

were, (5) $\quad\quad \omega_2 = V\overline{\dfrac{C}{M_2 r_2^2}}$ and (6) $\quad\quad \omega_2 j = \dfrac{D_2}{M_2 r_2^2}$ The quantity $j/2 = .707$ if the beam has critical damping through its torque link, which was estimated to be the case from the behaviour of a model, and is more easily determined than the quantity D.

Substituting the above quantities and R in Equations 1 and 2 and equating in phase and out of phase components and solving gives:

(7)

$$\alpha_2/(\omega) = F/W_1 \sqrt{\dfrac{1 + j^2 m \Omega}{[-\Omega^2 m + \Omega(R + 1 + m) - 1]^2 + [\Omega(R-1) + 1]^2 \Omega m j^2}}$$

where:

$\alpha_2 \omega$ = the amplitude at the beam and (8) $\quad\quad \dfrac{\omega^2}{\omega_1^2} = \Omega \dfrac{\omega_1^2}{\omega_2^2} = m$ Several properties of the system can be obtained from the expression for $\alpha_2(\omega)$. Assuming $r=0$ (no damping) the formula reduces to:

(9) $\quad \dfrac{\alpha_2(\omega)}{\text{undamped}} = \dfrac{F/W_1}{-\Omega^2 m + \Omega(R+1+m) - 1}$ Resonances occur for $\omega$ at which the denominator vanishes:

(10) $\quad \Omega_{\text{res}} = \dfrac{\omega^2}{\omega_1^2} = \dfrac{R+1+m}{2m} \pm \sqrt{\dfrac{(R+1+m)^2}{2m} - \dfrac{1}{m}}$ Although only an approximation, these resonance frequencies can give a picture of the behaviour of the real system. They are plotted for varying $$\frac{\omega_1}{\omega_2} \text{ and } \frac{M_2 r_2^2}{M_1 r_1^2}$$

Figure 4:
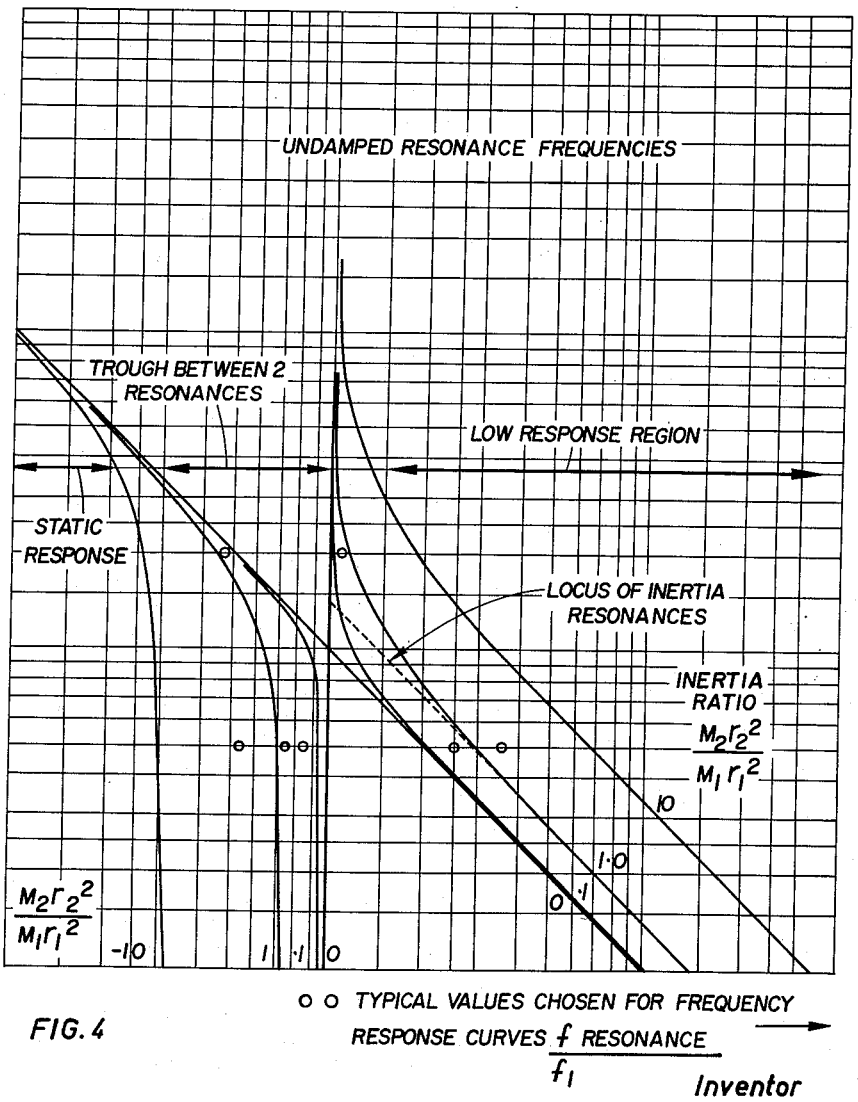
FIGURE 4 is a chart illustrating frequency response curves of undamped systems.

(in FIGURE 4).

It is seen that there are always two resonance frequencies, one above the larger of $\omega_1$ or $\omega_2$ and one below the smaller of $\omega_1$ or $\omega_2$. The resonance frequency shift above or below $\omega_1$ or $\omega_2$ is greatest when $\omega_1 = \omega_2$, and increases as $$\frac{M_2 r_2^2}{M_1 r_1^2}$$

increases.

The aim of the suspension is to provide a wide region of low response ($\alpha_2(\omega)$ small). Such a region always exists above the higher of the two resonance frequencies. The obvious conclusion is that both the pendulum frequency $\omega_1$ and the rubber-dipole frequency $\omega_2 \sqrt{1 - r^2/4}$ have to be kept as small as possible without permitting deflections to become too large. A further conclusion is that $$\frac{M_2 r_2^2}{M_1 r_1^2}$$

should not be allowed to be much larger than unity, if the higher resonance is peaky. On the other hand there is no obvious preferred value for $\omega_1/\omega_2$, and even $\omega_1 = \omega_2$ is not necessarily detrimental, since the resonances do not coalesce.

From the preliminary design of the suspension, it appears that the rubber-dipole frequency $\omega_2$ cannot be chosen much below 1 c./sec. The pendulum frequency $\omega_1$ can be chosen with the dimensions 1 and $r_1$. In order to keep the low response region as large as possible, it seems that $\omega_1$ should be chosen $\leq \omega_2$.

Returning to the formula for $\alpha_2(\omega)$ with damping, it can be seen that the above calculated resonances are reduced ($\alpha_2 \neq \infty$) because the second bracket in the denominator does not vanish with the first. This is the effect of damping. Even with damping however, certain combinations of inertias lead to undamped resonances. This occurs when:

(11) $\quad \left.\begin{array}{l} \Omega^2 - \Omega \dfrac{R+1+m}{m} + \dfrac{1}{m} = 0 \\ (R-1)\Omega + 1 = 0 \end{array}\right\}$ simultaneously Solving yields:

$R_{\text{crit}} = 1 - \dfrac{m}{2}; \quad \Omega_{\text{crit}} = \dfrac{2}{m} \begin{cases} \text{and trivial case of } R_{\text{crit}} \\ = 0 \, \Omega = 1 \text{ weightless beam} \end{cases}$ or

(12) $\quad \dfrac{(M_2 r_2^2)}{(M_1 r_1^2)_{\text{crit}}} = 1 - \dfrac{\omega_1^2}{2\omega_2^2}; \quad \dfrac{\omega_{\text{crit}}}{\omega_1} = \sqrt{2} \Big/ \dfrac{\omega_1}{\omega_2}$ It is seen that in all cases where $R < 1$, one of the resonances (the higher one) can become undamped ($\alpha_2 = \infty$) for a certain critical inertia ratio. The locus of these undamped resonances is shown on FIGURE 4 for the various $\omega_1/\omega_2$ and $$\frac{M_2 r_2^2}{M_1 r_1^2}$$

These resonances should be avoided completely.

In order to obtain information on the amplitudes at resonance, the function $\alpha_2(\omega)$ must be plotted for specific cases. This was done and the results shown on FIGURE 5. The cases selected were:

(1) Dipole undamped frequency = $f_2$ = 1 c./s. damping .7 critical
    Pendulum frequency $f_1$ = .5 c./s. inertia ratio = .5
(2) $f_2$ = 1 c./s. damping .7 critical
    $f_1$ = .5 c./s. inertia ratio critical = .875
(3) $f_2$ = .5 c./s. damping .7 critical
    $f_1$ = 1 c./s. inertia ratio = .5
(4) $f_2$ = 1 c./s. damping .7 critical
    $f_1$ = .5 c./s. inertia ratio = 2

The responses were calculated for unit force per pendulum weight, or can be considered as ratio of dynamic dipole amplitudes to static pendulum amplitude.

The curve for Case 1 shows the stronger resonance as the lower frequency peak (pendulum), the weaker resonance as the higher one (dipole), very much attenuated. In Case 2 where the inertia ratio is critical the higher frequency resonance has an infinite peak at $f = 1.45$ c./s. In Case 3 where the pendulum frequency is higher than the dipole frequency the higher frequency peak is the largest, but not infinite. In Case 4 where the inertia ratio is largest (2) the higher frequency resonance is shifted to the right, but is of negligeable size, whereas the lower frequency resonance is shifted to the left. In all cases the response curve approaches $1/f^3$ for large frequencies ($10^3$ smaller every decade). The crossing of unit response (frequency above which response is smaller than $n \times$ static response shows the suspension characteristics of the 4 cases for low frequencies):

| Case | 1 | 2 | 3 | 4 |
|---|---|---|---|---|
| $\alpha_2 = \alpha_2$ static; $f_{\text{unit}} =$ | .67 | 1.5 | 1.3 | .37 |
| $\alpha_2 = \dfrac{1}{10} \alpha_2$ static; $f_{\dfrac{\text{unit}}{10}} =$ | 1.8 | 2.0 | 2.1 | 1.5 |

Case 4 is seen to give the least low frequency response, despite its higher second resonance frequency. Therefore a suspension having its dipole frequency above the pendulum frequency and a dipole inertia larger than the pendulum inertia, for equal pendulum weight, has better low frequency isolation properties. Such a system automatically avoids an inertia resonance because $R > 1$. At the same time it must be remembered that response amplitudes are decreased across the board if the pendulum weight is increased.

The following desirable characteristics have so far been established:

(a) Low dipole frequency = $\begin{cases} \text{high dipole inertia, mass} \\ \text{or radius of gyration, low} \\ \text{rubber stiffness} \end{cases}$ (b) Lower pendulum frequency = $\begin{cases} \text{small CG excen-} \\ \text{tricity large radius} \\ \text{of gyration} \end{cases}$ (c) High inertia ratio = $\begin{cases} \text{high dipole inertia, mass or ra-} \\ \text{dius of gyration, low pendu-} \\ \text{lum inertia, radius of gyration} \end{cases}$ (d) High pendulum mass.

A set of dimensions compatible with the above analysis (Case 4) and with space requirements of a particular application (see FIGURES 6 and 7) are as follows:

*Vertical Mounting*

Beam:
  $W_2$ = 2.5 lb.
  $L$ = 12.5 lb.
  $f$ = .7 c.p.s.
Pendulum:
  $W_1$ = 4 lb.
  $D$ = 5.5 in.
  $L$ = .10 in.

Giving:

$$f = .5 \text{ c.p.s.}$$
$$f_2 = 1 \text{ c.p.s.}$$
$$\frac{M_2 r_2^2}{M_1 r_1^2} = 2.1$$

and $$\alpha_2 \text{ (static)} = \frac{.25 \text{ rad.}}{\text{lb.}}$$

*Horizontal Mounting*

$W_2 = 2.5$ lb.
$L = 12.5$ in.
$f$ (beam) $= .7$ c.p.s.
$W_1$ up $= 1.9$ lb.
$W_1$ lo $= 2.1$ lb.
$D = 4$ in.

Giving:

$$f_1 = .5 \text{ c.p.s.}$$
$$f_2 = 1 \text{ c.p.s.}$$
$$\frac{M_2 r_2^2}{M_1 r_1^2} = 2.1$$

and $$\alpha_2 \text{ (static)} = .25 \frac{\text{rad.}}{\text{lb.}}$$

The above dimensions are based upon the assumption that the gimbal bearings can withstand a weight of 6.5 lb. and that the beam frequency is adequate to prevent friction effects.

A specific example of a system that has been operated successfully is as follows. A ferrite rod of about 8″ length with a coil wound upon it can be mounted horizontally according to the present invention within a 8″ diameter tube, 8″ long, the rod having a self resonant frequency of one cycle per second. This coil will sense electromagnetic frequencies above 8 cycles per second with negligible distortions from rapid and violent movements of the carrier in the earth magnetic field. An isolation system having a multi-degree-of-freedom of movement, would require a static deflection of approximately 10″ to give a similar self resonant frequency and hence similar vibration isolation, and would require a mounting tube of between 20 and 30″ diameter and similar length. At still lower self-resonant frequencies for the satisfactory detection of signals in the region of 1 cycle per second practical problems of shock mounting in reasonably sized packages for multi-degree-of-freedom systems become even greater whilst very few difficulties are involved in achieving very low frequency rotational isolation by the practice of the present invention.

The operation of a preferred embodiment such as illustrated in FIGURE 2 upon being mounted substantially vertically within a suitable carrier is as follows.

As will be seen from the above discussion it is desirable to isolate the instrument or dipole from shock movements which generate high frequency noise voltages in the dipole, since the frequency is related to the derivative of the dipole movement. That is to say the rate of change of magnetic flux through the dipole determines the frequency of the generated noise voltages.

Sudden movements of the carrier produce shock excitation of frame 35 and thus cause frame 35 to move about the pitch, roll or yaw axes. The pendulum formed by intermediate gimbal ring 41 and weights 43 and 44 pivots about the roll axis by means of bearings 42 and 42a and about the pitch axis on bearings 39 and 40 on outer gimbal ring 38. The balanced beam, that is instrument 50, pivots about the roll axis on bearings 48 and 49 and about the pitch axis on bearings 45 and 46 on inner gimbal ring 47.

The mass of weights 43 and 44 resists sudden movement about the roll and pitch axes since, being pivoted for movement as aforesaid, the inertia of this pendulum smooths out shock excitation. The balanced beam formed by instrument 50 also possesses inertia and will also smooth out shock movement transmitted thereto. Thus sudden movements of a carrier causing high frequency vibrations or movements are not transmitted through the system and the instrument is thus isolated from high frequency shock excitation.

Flexible members 51, 52, 54 and 55 orient instrument 50 with respect to the pendulum and the pendulum by gravity is oriented in space. The flexible members while thus orienting the instrument with respect to a reference orientation in addition smooth out sudden shock movements occurring about their respective axes of influence thus minimizing shock excitation within the instrument itself.

In a similar manner the horizontal instrument mounting as shown in FIGURE 1 smooths out sudden movements or shock about the pitch axis by a similar use of a pendulum, that is outer gimbal ring 12 and weights 15 and 16, and a balanced beam, that is instrument 20. Flexible members 23, 24, 28, and 29 serve a similar use to those shown in FIGURE 2 and in addition flexible members 28 and 29 act as as simple shock absorbers for movement about the yaw axis.

From the foregoing it will be appreciated that the shock isolation achieved by the invention is specifically tuned or calibrated to high frequency vibrations or movements of the type which are a substantial cause of random noise occuring in instruments such as magnetic dipoles and magnetometers. Low frequency movements will not be isolated by the system of the invention in its present form and such movements will be transmitted to the instrument and low frequency noise signals will be generated therein. Such low frequency noise signals can, however, be readily eliminated by the inclusion of a high pass filter network in which such low frequency signals are eliminated. The terms high and low frequency as used herein are of course only relative terms the basic frequency to which they are related being in this preferred embodiment the natural frequency of the rotational movement of the instrument itself about its respective axes.

While two axis isolation has been disclosed it will be seen that this is a preferred method of providing shock isolation for a particular application, that is isolation of a magnetic dipole used for measuring the strength of the earth's magnetic field. It is also contemplated that a single axis shock isolation system could be used where it is desirable to smooth out movement in one direction only.

Further to this it will be evident that isolation of shock may also be accomplished about all three axes by providing at least one more gimbal ring adapted for movement about the third axis.

Although in the above discussion the use of bearings such as bearing 13 pivoting on pad 13a is disclosed as a preferred method it will be evident that other means may be employed such as for example planetary rollers co-operating with annular guides or any other suitable system, the desired result being controllable rotation about selected axes.

In the foregoing description of a preferred embodiment a gravimetric reference system is used by way of example only to provide reference orientation for the instrument mounting system of the present invention, that is a pendulum and balanced beam are acted upon by gravity as described to isolate the dipole from shock movements. The method could be applied to other reference systems such as inertial and magnetic wherein any acceleration within the system could replace the effect of gravity thus forming a basis or reference for the dynamic comparison of the masses of the beam and pendulum.

Obviously the present invention may also be used to advantage in mounting other types of measuring devices and instruments than those disclosed above and the uses as stated are done so by way of example only and are not to be considered as limiting the scope of this invention.

It will be further understood that, although the mounting system of the present invention has been described for use with various electromagnetic detection instruments, the system may also be utilized with various types of emission devices and instruments.

Thus, in the case where it is desirable to isolate say, a radar wave antenna, from certain undesirable vibration frequencies, such as on airborne radar systems, the present invention can be used to advantage. The same is true for other types of wave transmission systems, such as audio, magnetic, and the like, wherein otherwise uncontrollable vibrations cause noise interference in either the transmitted or received signal.

While preferred embodiments of this invention have been disclosed it will be understood that various alterations in design, such as required in practice, may be resorted to while still falling within the scope of the appended claims.

What I claim is:

1. In a mounting system for an instrument sensitive to extraneous rotational vibration about at least one axis of said instrument at a frequency at or above a predetermined frequency range wherein said at least one instrument is pivotally mounted in gimbals to permit rotational movement thereof about said axis the combination therewith of:
   (a) flexible resilient biassing means extending between said instrument and at least a portion of said gimbals biassing movement of said instrument about said at least one axis thereof and constituting therewith a dipole system, said dipole system being tuned to a natural frequency of oscillation about said axis substantially lower than the frequencies of said rotational vibration.

2. An instrument mounting apparatus for an instrument deleteriously affected by extraneous rotational vibration about at least one axis of said instrument at a frequency at or above a predetermined range and comprising:
   (a) at least two concentric gimbal rings located one within the other;
   (b) outer bearing means pivotally supporting the outer of said gimbal rings for swinging about a central axis thereof;
   (c) pivotal bearing means extending between said gimbal rings and permitting the same to swing about respective central axes thereof, the central axes of adjoining said gimbal rings being normal to one another;
   (d) instrument bearing means extending from the inner said gimbal ring for pivotally mounting an instrument therein and permitting the same to swing about a central axis thereof, said central axis being normal to the central axis of said inner gimbal ring;
   (e) and flexible biassing means extending between said instrument and a portion of said apparatus biassing movement of said instrument about at least one axis thereof and constituting therewith a dipole system, said dipole system being tuned to a natural frequency of oscillation about said axis substantially lower than the frequencies of said rotational vibrations.

3. An instrument mounting apparatus for an instrument deleteriously affected by extraneous rotational vibration about at least one axis of said instrument at a frequency at or above a predetermined range and comprising:
   (a) at least two concentric gimbal rings located one within the other;
   (b) outer bearing means pivotally supporting the outer of said gimbal rings for swinging about a central axis thereof;
   (c) pivotal bearing means extending between said gimbal rings and permitting the same to swing about respective central axes thereof, the central axes of adjoining said gimbal rings being normal to one another;
   (d) instrument bearing means extending from the inner said gimbal ring for pivotally mounting an instrument therein and permitting the same to swing about a central axis thereof, said central axis being normal to the central axis of said inner gimbal ring;
   (e) and flexible resilient biassing means extending between said instrument and one of said gimbal rings biassing movement of said instrument about at least one axis thereof and constituting therewith a dipole system, said dipole system being tuned to a natural frequency of oscillation about said axis substantially lower than the frequencies of said rotational vibrations.

4. An instrument mounting apparatus for an instrument deleteriously affected by extraneous rotational vibration about at least one axis of said instrument at a frequency at or above a predetermined range and comprising:
   (a) at least two concentric gimbal rings located one within the other;
   (b) outer bearing means pivotally supporting the outer of said gimbal rings for swinging about a central axis thereof;
   (c) pivotal bearing means extending between said gimbal rings and permitting the same to swing about respective central axes thereof, the central axes of adjoining said gimbal rings being normal to one another;
   (d) instrument bearing means extending from the inner said gimbal ring for pivotally mounting an instrument therein and permitting the same to swing about a central axis thereof, said central axis being normal to the central axis of said inner gimbal ring;
   (e) and means biassing said ring to adopt a reference orientation about its said central axis and tuned to permit the same to oscillate about said axis at a predetermined frequency substantially below said frequencies of said rotational vibrations.

5. An instrument mounting apparatus for an instrument deleteriously affected by extraneous rotational vibration about at least one axis of said instrument at a frequency at or above a predetermined range and comprising:
   (a) at least two concentric gimbal rings located one within the other;
   (b) outer bearing means pivotally supporting the outer of said gimbal rings for swinging about a central axis thereof;
   (c) pivotal bearing means extending between said gimbal rings and permitting the same to swing about respective central axes thereof, the central axes of adjoining said gimbal rings being normal to one another;
   (d) instrument bearing means extending from the inner said gimbal ring for pivotally mounting an instrument therein and permitting the same to swing about a central axis thereof, said central axis being normal to the central axis of said inner gimbal ring;
   (e) and resilient flexible members extending between a said ring and said instrument biassing movement of said instrument about at least one axis thereof and constituting therewith a dipole system being tuned to a natural frequency of oscillation about said axis substantially lower than the frequencies of said rotational vibrations;
   (f) and means weighting said ring and constituting the same a pendulum system pivoting about its respective said central axis.

6. An instrument mounting apparatus for an instrument deleteriously affected by extraneous rotational vibration about at least one axis of said instrument at a frequency at or above a predetermined range and comprising:
 (a) outer bearing means;
 (b) an outer gimbal ring pivotally supported by said outer bearing means for swinging about a central axis thereof;
 (c) inner bearing means extending from said outer gimbal ring;
 (d) an inner gimbal ring pivotally supported by said inner bearing means for swinging about a central axis thereof, said central axis of said inner gimbal ring being normal to said central axis of said outer gimbal ring;
 (e) instrument bearing means extending from said inner gimbal ring for pivotally supporting an instrument therein, said instrument bearing means being located in alignment with the central axis of said outer gimbal means;
 (f) means biassing the movements of one of said rings;
 (g) and biassing means extending between said last mentioned ring and said instrument biassing movement of said instrument about at least one axis thereof and constituting therewith a dipole system, said dipole system being tuned to a natural frequency of oscillation about said axis substantially lower than the frequencies of said rotational vibrations.

7. An instrument mounting apparatus for an instrument deleteriously affected by extraneous rotational vibration about at least one axis of said instrument at a frequency at or above a predetermined range and comprising:
 (a) outer bearing means;
 (b) an outer gimbal ring pivotally supported by said outer bearing means for swinging about a central axis thereof;
 (c) inner bearing means extending from said outer gimbal ring;
 (d) an inner gimbal ring pivotally supported by said inner bearing means for swinging about a central axis thereof, said central axis of said inner gimbal ring being normal to said central axis of said outer gimbal ring;
 (e) instrument bearing means extending from said inner gimbal ring for pivotally supporting an instrument therein, said instrument bearing means being located in alignment with the central axis of said outer gimbal means;
 (f) and flexible biassing means extending between said instrument and at least one of said rings biassing rotational movement of said instrument about at least two axes thereof and constituting therewith a dipole system, said dipole system being tuned to a natural frequency of oscillation about both said axes substantially lower than the frequencies of said rotational vibrations.

8. An instrument mounting apparatus for an instrument deleteriously affected by extraneous rotational vibration about at least one axis of said instrument at a frequency at or above a predetermined range and comprising:
 (a) outer bearing means;
 (b) an outer gimbal ring pivotally supported by said outer bearing means for swinging about a central axis thereof;
 (c) inner bearing means extending from said outer gimbal ring;
 (d) an inner gimbal ring pivotally supported by said inner bearing means for swinging about a central axis thereof, said central axis of said inner gimbal ring being normal to said central axis of said outer gimbal ring;
 (e) instrument bearing means extending from said inner gimbal ring for pivotally supporting an instrument therein, said instrument bearing means being located in alignment with the central axis of said outer gimbal means;
 (f) weights attached to said outer gimbal ring constituting the same a pendulum system pivoting about said outer bearing means biassing said ring to adopt a reference orientation,
 (g) and flexible biassing means extending between said instrument and said last mentioned ring biassing rotational movement of said instrument about at least one axis thereof and constituting therewith a dipole system, said dipole system being tuned to a natural frequency of oscillation about said axis substantially lower than the frequencies of said rotational vibrations.

9. An instrument mounting apparatus for an instrument deleteriously affected by extraneous rotational vibration about at least one axis of said instrument at a frequency at or above a predetermined range and comprising:
 (a) outer bearing means;
 (b) an outer gimbal ring pivotally supported by said outer bearing means for swinging about a central axis thereof;
 (c) inner bearing means extending from said outer gimbal ring;
 (d) an inner gimbal ring pivotally supported by said inner bearing means for swinging about a central axis thereof, said central axis of said inner gimbal ring being normal to said central axis of said outer gimbal ring;
 (e) instrument bearing means extending from said inner gimbal ring for pivotally supporting an instrument therein, said instrument bearing means being located in alignment with the central axis of said outer gimbal means;
 (f) weights attached to said outer gimbal ring constituting the same a pendulum system pivoting about said outer bearing means;
 (g) and flexible biassing members fastened to said last mentioned ring at equally spaced points therearound and connected to said instrument biassing rotational movement of said instrument about at least two axes thereof and constituting therewith a dipole system, said dipole system being tuned to a natural frequency of oscillation about both said axes substantially lower than the frequencies of said rotational vibrations.

10. An instrument mounting apparatus for an instrument deleteriously affected by extraneous rotational vibration about at least one axis of said instrument at a frequency at or above a predetermined range and comprising:
 (a) outer bearing means;
 (b) an outer gimbal ring pivotally supported by said outer bearing means for swinging about a central axis thereof;
 (c) intermediate bearing means extending from said outer gimbal ring;
 (d) an intermediate gimbal ring pivotally supported by said intermediate bearing means for swinging about a central axis thereof, said central axis being normal to said central axis of said outer gimbal ring;
 (e) inner bearing means extending from said intermediate gimbal ring;
 (f) an inner gimbal ring pivotally supported by said inner bearing means for swinging about a central axis thereof, said central axis being in alignment with said central axis of said outer gimbal ring;
 (g) instrument bearing means extending from said inner gimbal ring for pivotally supporting an instrument therein, said instrument bearing means being located in alignment with said central axis of said intermediate gimbal ring;
 (h) flexible biassing means extending between said instrument and a portion of said apparatus biassing movement of said instrument about at least one axis thereof and constituting therewith a dipole system, said dipole system being tuned to a natural frequency of oscillation about said axis substantially lower than the frequencies of said rotational vibrations.

11. An instrument mounting apparatus for an instrument deleteriously affected by extraneous rotational vibration about at least one axis of said instrument at a frequency at or above a predetermined range and comprising:
  (a) outer bearing means;
  (b) an outer gimbal ring pivotally supported by said outer bearing means for swinging about a central axis thereof;
  (c) an intermediate gimbal ring pivotally supported by said intermediate bearing means for swinging about a central axis thereof, said central axis being normal to said central axis of said outer gimbal ring;
  (e) an inner gimbal ring pivotally supported by said inner bearing means for swinging about a central axis thereof, said central axis being in alignment with said central axis of said outer gimbal ring;
  (g) instrument bearing means extending from said inner gimbal ring for pivotally supporting an instrument therein, said instrument bearing means being located in alignment with said central axis of said intermediate gimbal ring;
  (h) pendulum means on said intermediate gimbal ring biassing the same to adopt a reference orientation;
  (i) and flexible biassing means extending between said instrument and said intermediate gimbal ring biassing movement of said instrument about at least one axis thereof and constituting therewith a dipole system, said dipole system being tuned to a natural frequency of oscillation about said axis substantially lower than the frequencies of said rotational vibrations.

12. An instrument mounting apparatus for an instrument deleteriously affected by extraneous rotational vibration about at least one axis of said instrument at a frequency at or above a predetermined range and comprising:
  (a) outer bearing means;
  (b) an outer gimbal ring pivotally supported by said outer bearing means for swinging about a central axis thereof;
  (c) intermediate bearing means extending from said outer gimbal ring;
  (d) an intermediate gimbal ring pivotally supported by said intermediate bearing means for swinging about a central axis thereof, said central axis being normal to said central axis of said outer gimbal ring;
  (e) inner bearing means extending from said intermediate gimbal ring;
  (f) an inner gimbal ring pivotally supported by said inner bearing means for swinging about a central axis thereof, said central axis being in alignment with said central axis of said outer gimbal ring;
  (g) instrument bearing means extending from said inner gimbal ring for pivotally supporting an instrument therein, said instrument bearing means being located in alignment with said central axis of said intermediate gimbal ring;
  (h) weights attached to said intermediate gimbal ring constituting the same a pendulum system pivoting about said intermediate bearing means biassing the same to adopt a reference orientation,
  (i) and flexible biassing means fastened to said last mentioned ring at equally spaced points therearound and connected to said instrument biassing rotational movement of said instrument about at least two axes thereof and constituting therewith a dipole system, said dipole system being tuned to a natural frequency of oscillation about both said axes substantially lower than the frequencies of said rotational vibrations.

13. An instrument mounting apparatus for an instrument deleteriously affected by extraneous rotational vibrations about at least one axis of said instrument at a frequency at or above a predetermined range comprising:
  (a) a frame member having a cutout therein positioned in a substantially vertical plane;
  (b) an outer gimbal ring pivotally secured within said cutout to said frame, thereby adapted for limited rotation about the pitch axis;
  (c) an inner gimbal ring pivotally secured within said outer gimbal ring, thereby adapted for limited rotation about the yaw axis;
  (d) pivotal instrument bearing means within said inner gimbal ring, permitting limited rotation thereof about the pitch axis;
  (e) at least two flexible, rubber-like cord members extending from said outer gimbal ring interconnected with said instrument biassing rotational movement thereof about at least one said axis thereof and constituting therewith a dipole system, said dipole system being tuned to a natural frequency of oscillation about said axis substantially lower than the frequencies of said rotational vibrations;
  (f) and means weighting said outer gimbal ring and biassing the same to adopt a reference orientation about the pitch axis; the uncoupled frequency of rotation of said outer gimbal ring about said pitch axis being lower than the uncoupled frequency of said instrument.

14. An instrument mounting apparatus for an instrument deleteriously affected by extraneous rotational vibrations about at least one axis of said instrument at a frequency at or above a predetermined range comprising:
  (a) a frame member having a cutout therein positioned in a substantially vertical plane;
  (b) an outer gimbal ring pivotally secured within said cutout to said frame, thereby adapted for limited rotation about the pitch axis;
  (c) means biassing said outer gimbal ring to oscillate at a predetermined frequency about the pitch axis;
  (d) an inner gimbal ring pivotally secured within said outer gimbal ring, thereby adapted for limited rotation about the yaw axis;
  (e) an instrument bearing means secured within said inner gimbal ring for limited rotation of a said instrument about the pitch axis;
  (f) an instrument carried by said bearing means and being pivoted about a midpoint, thereby constituting a balanced beam;
  (g) at least two flexible members interconnected between said instrument and said outer gimbal ring biassing rotational movement of said instrument about at least one axis thereof and constituting therewith a dipole system, said dipole system being tuned to a natural frequency of oscillation about said axis substantially lower than the frequencies of said rotational vibrations;
the moment of inertia of said outer gimbal ring being less than the moment of inertia of said instrument.

15. An instrument mounting apparatus for an instrument deleteriously affected by extraneous rotational vibrations about at least one axis of said instrument at a frequency at or above a predetermined range comprising:
  (a) a frame member having a cutout therein positioned in a substantially vertical plane;
  (b) an outer gimbal ring pivotally secured within said cutout to said frame, thereby adapted for limited rotation about the pitch axis,
said outer gimbal ring having a centre of gravity below the pitch axis thereof thus constituting a pendulum;
  (d) an inner gimbal ring pivotally secured within said outer gimbal ring, thereby adapted for limited rotation about the yaw axis;
  (e) an instrument pivotally secured within said inner gimbal ring for limited rotation about the pitch axis;
  (f) and flexible, rubber-like, cord means between said pendulum and said instrument, said cord means being at least partially coiled and of sufficient length to prevent tension stresses developing therein on movement of said instrument while developing tension stresses therein biassing movement of said instrument.

16. An instrument mounting apparatus for an instrument deleteriously affected by extraneous rotational vibrations about at least one axis of said instrument at a frequency at or above a predetermined range comprising:
    (a) a frame member having a cutout therein positioned in a substantially horizontal plane;
    (b) an outer gimbal ring pivotally secured within said cutout to said frame, thereby adapted for limited rotation about the pitch axis;
    (c) an intermediate gimbal ring pivotally secured within said outer gimbal ring, thereby adapted for limited rotation about the roll axis;
    (d) weights biassing said intermediate gimbal ring to oscillate at a predetermined frequency about the roll axis;
    (e) an inner gimbal ring pivotally secured within said intermediate gimbal ring, thereby adapted for limited rotation about the pitch axis;
    (f) an instrument pivotally secured within said inner gimbal ring for limited rotation about the roll axis;
    (g) at least two flexible biassing members interconnected between said instrument and said intermediate gimbal ring;
    (h) and the mass of said weights being greater than the mass of said instrument.

17. An instrument mounting apparatus for an instrument deleteriously affected by extraneous rotational vibrations about at least one axis of said instrument at a frequency at or above a predetermined range comprising:
    (a) a frame member having a cutout therein positioned in a substantially horizontal plane;
    (b) an outer gimbal ring pivotally secured within said cutout to said frame, thereby adapted for limited rotation about the pitch axis;
    (c) an intermediate gimbal ring pivotally secured within said outer gimbal ring, thereby adapted for limited rotation about the roll axis;
    (d) weights secured to said intermediate gimbal ring to form a pendulum having a predetermined frequency of oscillation;
    (e) an inner gimbal ring pivotally secured within said intermediate gimbal ring, thereby adapted for limited rotation about the pitch axis;
    (f) an instrument pivotally secured within said inner gimbal ring for limited rotation about the roll axis;
    (g) said instrument being pivoted about a midpoint, constituting a balanced beam;
    (h) at least two biassing members interconnected between said instrument and said intermediate gimbal ring;
    (i) the moment of inertia of said pendulum being less than the moment of inertia of said instrument;
    (j) and the mass of said pendulum being greater than the mass of said instrument.

18. In a mounting system for an instrument sensitive to extraneous rotational vibrations about at least one axis of said instrument at a frequency at or above a predetermined range wherein said instrument is mounted in gimbals to permit rotational movement thereof about said axis the combination therewith of:
    (a) biassing means extending between said instrument and a portion at least of said system biassing movement of said instrument about at least one axis thereof and constituting therewith a dipole system, said dipole system being tuned to a natural frequency of oscillation about said axis substantially lower than said predetermined range of frequencies of said rotational vibrations.

19. In a mounting system for an instrument sensitive to extraneous rotational vibrations about at least one axis of said instrument at a frequency at or above a predetermined range wherein said instrument is mounted in gimbals to permit rotational movement thereof about said axis the combination therewith of:
    (a) flexible rubber-like cord members extending between said instrument and at least a portion of said mounting system said cord members being at least partially coiled to prevent development of tension stresses therein while developing tension stresses in response to movement of said instrument to bias the same about at least one axis thereof and constituting therewith a dipole system, said dipole system being tuned to a natural frequency of oscillation about said axis substantially lower than the frequencies of said rotational vibrations.

References Cited in the file of this patent

UNITED STATES PATENTS

| | | |
|---|---|---|
| 1,825,345 | Fieux | Sept. 29, 1931 |
| 1,906,719 | Richter | May 2, 1933 |
| 2,246,738 | Lauck | June 24, 1941 |
| 2,735,063 | Schonstedt | Feb. 14, 1956 |
| 2,922,228 | Davis | Jan. 26, 1960 |

FOREIGN PATENTS

| | | |
|---|---|---|
| 3,644 | Great Britain | Jan. 30, 1813 |
| 815,260 | Great Britain | June 24, 1959 |